Sept. 19, 1950     A. J. HILGERT     2,523,213
FLUID PRESSURE OPERATED DEVICE
Filed Feb. 24, 1947
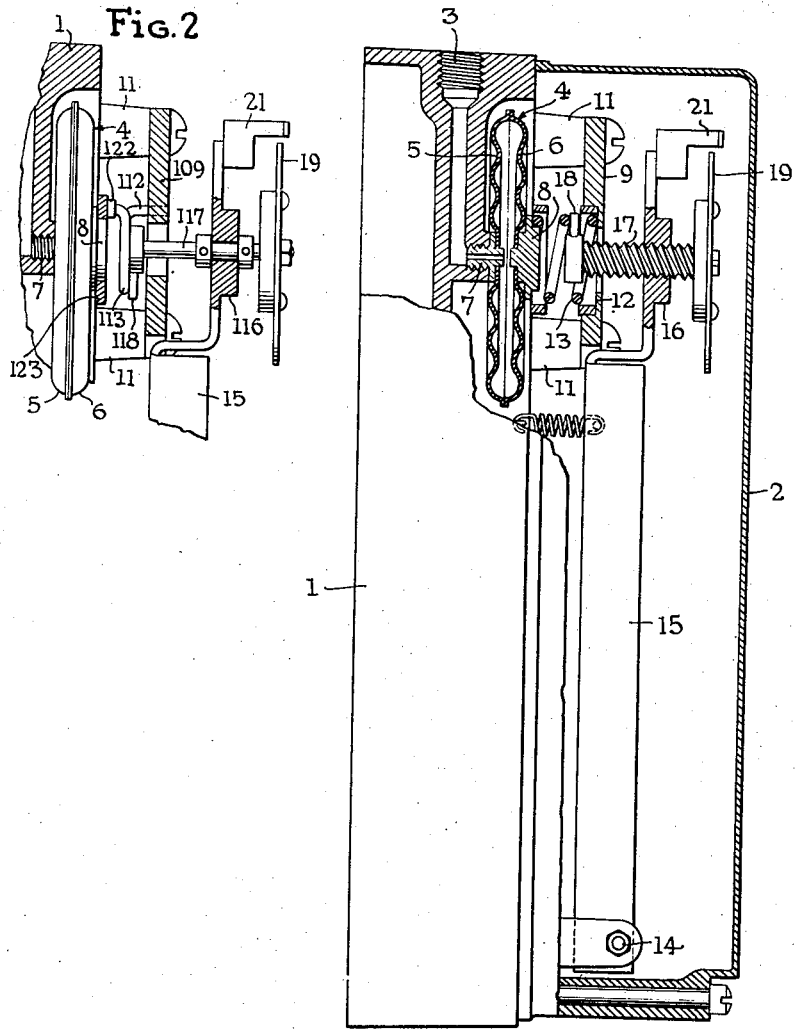
Inventor
Adolph J. Hilgert
Attorneys Patented Sept. 19, 1950

2,523,213

UNITED STATES PATENT OFFICE 2,523,213

FLUID PRESSURE OPERATED DEVICE

Adolph J. Hilgert, Milwaukee, Wis., assignor to Johnson Service Company, Milwaukee, Wis., a corporation of Wisconsin Application February 24, 1947, Serial No. 730,433

10 Claims. (Cl. 74—99)

1

This invention relates to fluid pressure operated devices and particularly to progressively adjustable means for deriving a reduced proportional motion from the motion of a spring loaded movable abutment, such as a piston, diaphragm or the like, subject to a varying pressure.

Mechanisms of this type are used in indicating, recording, and automatic controlling devices, in which compactness is usually a vital consideration.

According to the invention, the abutment reacts directly on one end of a helical loading spring of uniform spiral pitch, the other end of the spring being mounted on a fixed support. The proportional motion is derived directly from a chosen point on the spring, the spring being designed so as to flex uniformly. Thus, the end of the spring at the abutment has the same motion as the abutment, the end of the spring at the support has no motion at all, a point at midlength of the spring has half the motion of the abutment, and so on proportionally throughout the length of the spring.

To transmit the motion of the abutment (modified in the desired proportion) to an element to be moved, that element carries a screw which extends coaxially within the spring and has a laterally extending lug which engages the spring at one point and affords the motion transmitting contact. The helical pitch of the screw conforms precisely to the helical pitch of the spring when the apparatus is in its zeroed setting, whatever that may be. As a consequence turning the screw will not affect the zeroed setting of the element which is moved, but will change the ratio of the proportional motion of that element as the abutment moves from such zeroed position.

Derivation of motion from the loading spring permits the elimination of variable ratio levers, and not only reduces the number of parts but ensures great compactness because the single adjusting part is partly housed within the spring.

Where the range of motion is not large it is possible to use a helical spring of zero pitch, with a motion transmitting "screw" also of zero pitch. In effect the spring is not quite a complete circle of wire rigidly fixed at one end to a support, and reacting against the moving element at its other end. The proportional motion transmitting element is a stem swiveled on an axis which is concentric with the spring circle and normal to the plane of the spring circle, and carries a radial arm engaging the spring.

2

The invention will now be described by reference to the accompanying drawing in which:

Fig. 1 is a view partly in elevation and partly in section of an instrument in which the invention is incorporated by the use of a helical spring of several turns.

Fig. 2 is a fragmentary similar view of a modification in which the spring is of the zero pitch variety and is of less than a complete turn.

Referring first to Fig. 1, the base 1 of the instrument has a cover 2 which encloses the working parts, not all of which are illustrated.

At the upper portion of base 1 is a pipe connection 3 leading from a space in which pressure varies from atmospheric to several pounds gage. A pressure motor generally indicated by the numeral 4 is subject to the pressure in connection 3.

In the illustrated embodiment this motor is in the form of two circular corrugated diaphragms 5 and 6 joined at their peripheries. Diaphragm 5 has a mounting nipple 7 screwed into base 1 and ported to connect the interior of the motor 4 with passage 3. A thrust block 8 is attached to the front of diaphragm 6 at the center thereof and is the moving element of the pressure motor. Any expansible chamber motor may be used and the moving element thereof could be of various forms known in the expansible chamber motor art, such as a cylinder, piston, diaphragm or the like. As a generic term for such a pressure moved element, the term "movable abutment" will be used hereinafter.

A plate 9 is fixed to lugs 11 formed on base 1 and has a circular spring seat 12 in which the outer end of a helical coil spring 13 is fixed. The other end of this spring reacts on thrust block 8 and is centered by a boss formed therein for that purpose. For purposes of description it will here be assumed that motor 4 in the position illustrated in the drawing is at atmospheric pressure, and hence inert, and that spring 13, unstressed, just fills the interval between block 8 and spring seat 12. This is one of several possible conditions.

In any case spring 13 is of uniform elasticity throughout its length (or as nearly so as practicable) and is wound with a uniform helical pitch.

Hinged at 14 to lugs formed on base 1 is a substantially vertical lever 15 which is long as compared to the range of movement of thrust block 8, so that the path of the upper end of lever 15 closely approximates a horizontal straight line when moved by motor 4. Threaded through a boss 16 on lever 15 is a quick-pitch screw 17, whose inner end extends coaxially into spring 13 and carries a radial finger 18 which engages one coil of spring 13. The lineal pitch of screw 17 and the lineal pitch of the spring helix are equal when the spring is unstressed.

Since the unstressed condition of spring 13 may be said to correspond to the zeroed condition of the instrument, turning of screw 17 changes the motion ratio between motor 4 and lever 15 without destroying the zeroing adjustment. A suitably graduated dial 19 is attached to the outer end of screw 17 and an index 21 coacts therewith to indicate the adjustment.

It is not necessary that the instrument have a zero setting in which the spring is unstressed. The important condition to establish is that when the spring is under whatever stress will establish the zeroed condition, the lineal helical pitch of the spring and the lineal helical pitch of screw 17 are equal. If this condition is satisfied, adjustment of motion ratio, effected by turning screw 17, will not displace the zero point or reference point of the instrument.

The embodiment shown in Fig. 2 is functionally the same and can be used where the motion to be modified is rather small. The parts 1—8 are unchanged, the apertured support 109 differs slightly in form but is mounted on lugs 11, as in Fig. 1. The fulcrum 14 and lever 15 are unchanged except that the hole in boss 116 is not threaded. Dial 19 and indicator 21 are essentially unchanged.

Spring 113 is nearly a complete flat circle of wire having one end 112 bent at 90° and soldered fast in a hole in plate 109. The other end of the spring has a small pad 122 in thrust engagement with a plate 123 carried by thrust block 8.

As a consequence the pitch of the spring is zero, and the pitch of the screw likewise must be zero. A screw of zero pitch would be in effect a swivel connection. To simplify construction stem 117 is swiveled in boss 116 and carries a finger 118 which enters into thrust engagement with the front of spring 113. Turning of dial 19 changes the point of engagement and thus changes the proportion of motion transmitted. The principle is the same as that underlying the construction shown in Fig. 1.

Various other modifications are possible. The spring may be arranged to act in tension instead of in compression. The motor may take various forms. Screw 17 need not be carried by a lever, for all that is required is guiding in the proper direction in a substantially straight line.

A helical spring such as that shown in Fig. 1 and a ring spring such as that shown in Fig. 2 have in common the important characteristic that the spring wire is stressed torsionally when the spring is loaded. It is this characteristic that assures the desired first degree proportional relation between load and deflection throughout the length of the spring.

Broadly considered the invention contemplates a part which moves against the opposition of a loading spring of the type in which the spring deflection varies uniformly (or substantially so) in proportion to distance measured from one end of the spring, and a second part which may derive proportional motion from any chosen point in the spring. With a helical spring the motion deriving part should be shifted in the same pitch relation. The arrangement of the screw 17 or swiveled (zero pitch) stem 117 are the simplest, but not the only possible arrangement. The same comment applies to the springs 13 or 113.

Hence the embodiments here described in detail should be taken as illustrative of the general principles and not as implying strict limitations.

What is claimed is:

1. A variable-ratio motion-transmitting device, comprising in combination a support; a first member movable in a right line path toward and from said support; a helical spring of substantially uniform helical pitch and elasticity connected at its opposite ends respectively to said support and to said first member with its axis parallel with said right line path; a second member guided to move relatively to said support in a path substantially parallel with said right line path; and means for connecting said second member with selected points along the spring helix comprising a third member screw threaded to said second member and having a radial lug affording a substantially point connection with the spring helix intermediate the ends thereof, said screw thread being coaxial with the spring helix and of a pitch equal to the pitch assumed by the spring helix in a predetermined position of said first member.

2. The combination defined in claim 1 in which said predetermined position is that in which said spring is unstressed.

3. The combination defined in claim 1 in which the spring comprises less than one turn and the helical pitch of the spring and the screw pitch are each zero.

4. The combination defined in claim 1 in which the spring comprises less than one turn, the helical pitch of the spring and the screw pitch are each zero, and said predetermined position is that in which the spring is unstressed.

5. The combination of a movable abutment; means for subjecting said abutment to a variable fluid pressure; a coil spring of substantially uniform helical pitch and elasticity arranged to resist motion of said abutment in response to said pressure; a member guided to move in substantially the direction of the axis of said spring; a screw substantially coaxial with said spring and adjustably mounted on said member with a screw thread whose pitch is equal to the helical pitch of the spring assumed when the abutment is in a particular position; and a member extending transversely of the axis of the screw into engagement with a coil of the spring.

6. The combination defined in claim 5, in which said "particular position" is at one limit of motion of said abutment.

7. The combination defined in claim 5, in which said particular position is a position of the abutment in which the latter is subject to a zero pressure differential and the spring is unstressed.

8. The combination defined in claim 5 in which the screw extends into the spring and the member which extends transversely is a radially extending pin.

9. The combination defined in claim 5, in which the helical pitch of the coil spring is zero in said particular position, the spring comprises less than one turn, and the pitch of said screw is zero.

10. The combination defined in claim 5, in which the helical pitch of the coil spring is zero and the spring is unstressed in said particular position, the spring comprises less than one turn, and the pitch of said screw is zero.

ADOLPH J. HILGERT.

(References on following page)

REFERENCES CITED

The following references are of record in the file of this patent:

UNITED STATES PATENTS

| Number | Name | Date |
|---|---|---|
| 1,116,268 | Hansen | Nov. 3, 1914 |
| 1,644,783 | Lissel | Oct. 11, 1927 |
| 2,159,513 | Taylor | May 23, 1939 |
| 2,169,524 | Fowler | Aug. 15, 1939 |
| 2,170,744 | Adler | Aug. 22, 1939 |
| 2,344,858 | Farmer | Mar. 21, 1944 |

FOREIGN PATENTS

| Number | Country | Date |
|---|---|---|
| 69,523 | Switzerland | July 1, 1915 |